US010002717B2

(12) United States Patent
Cao et al.

(10) Patent No.: US 10,002,717 B2
(45) Date of Patent: Jun. 19, 2018

(54) HIGH PERFORMANCE LITHIUM-ION CAPACITOR LAMINATE CELLS

(71) Applicant: GENERAL CAPACITOR, LLC, Tallahassee, FL (US)

(72) Inventors: Wanjun Cao, Tallahassee, FL (US); Harry Chen, Tallahassee, FL (US)

(73) Assignee: GENERAL CAPACITOR, LLC, Tallahassee, FL (US)

( * ) Notice: Subject to any disclaimer, the term of this patent is extended or adjusted under 35 U.S.C. 154(b) by 114 days.

(21) Appl. No.: 14/927,811

(22) Filed: Oct. 30, 2015

(65) Prior Publication Data

US 2016/0126023 A1    May 5, 2016

Related U.S. Application Data

(60) Provisional application No. 62/072,472, filed on Oct. 30, 2014.

(51) Int. Cl.

| | |
|---|---|
| *H01G 9/00* | (2006.01) |
| *H01G 9/04* | (2006.01) |
| *H01G 9/145* | (2006.01) |
| *H01G 11/06* | (2013.01) |
| *H01G 11/24* | (2013.01) |
| *H01G 11/26* | (2013.01) |
| *H01G 11/30* | (2013.01) |
| *H01G 11/42* | (2013.01) |
| *H01M 4/38* | (2006.01) |
| *H01G 11/50* | (2013.01) |

(52) U.S. Cl.
CPC ............ *H01G 11/06* (2013.01); *H01G 11/50* (2013.01); *Y02E 60/13* (2013.01)

(58) Field of Classification Search
CPC ....... H01M 4/382; H01G 11/06; H01G 11/24; H01G 11/26; H01G 11/30
USPC ................................ 361/502, 503, 508, 510
See application file for complete search history.

(56) References Cited

U.S. PATENT DOCUMENTS

| | | | |
|---|---|---|---|
| 2008/0094778 A1* | 4/2008 | Tanizaki | H01G 11/50 361/504 |
| 2009/0246626 A1* | 10/2009 | Tasaki | H01G 11/86 429/208 |
| 2012/0113566 A1* | 5/2012 | Terui | H01G 9/016 361/502 |

(Continued)

*Primary Examiner* — Eric Thomas
*Assistant Examiner* — Arun Ramaswamy
(74) *Attorney, Agent, or Firm* — Richard D. Clarke

(57) ABSTRACT

The present invention provides for high performance lithium-ion capacitor laminate cells that include positive electrodes, negative electrodes and organic solvent electrolyte with lithium salt, and a method for making said high performance lithium-ion capacitor laminate cells. These high performance lithium-ion capacitor laminate cells of the present invention, include a negative electrode which is pre-doped with sufficient lithium ions by employing lithium sources including lithium powder known as SLMP or thin lithium films on the surface of negative electrodes, and this pre-doping with placing lithium sources on negative electrode surface results in LIC laminate cells with considerably higher performance in specific energy, specific power and cycle life.

27 Claims, 14 Drawing Sheets

(56) References Cited

U.S. PATENT DOCUMENTS

2013/0070391 A1\* 3/2013 Zheng .................... H01G 9/042
                                                        361/508
2017/0062815 A1† 3/2017 Zhong \* cited by examiner
† cited by third party

TABLE 1

| CELL | Number of Positive Sheets (N) | Positive Electrode Size | | | Negative Electrode Size | | | SLMP Loading Mass Per Unit Area (mg/cm²) | Al/Ni Tab Size | | Positive Electrode Active Material |
|---|---|---|---|---|---|---|---|---|---|---|---|
| | | Length (mm) | width (mm) | thickness (μm) | Length (mm) | width (mm) | thickness (μm) | | width (mm) | thickness (mm) | |
| A1 | 9 | 109 | 109 | 236 | 110 | 110 | 190 | 1.2 | 50 | 0.2 | YP-50F |
| A2 | 17 | 109 | 109 | 236 | 110 | 110 | 190 | 1.2 | 50 | 0.2 | YP-50F |
| A3 | 25 | 109 | 109 | 236 | 110 | 110 | 190 | 1.2 | 50 | 0.2 | YP-50F |
| A4 | 17 | 163.5 | 109 | 236 | 165 | 110 | 190 | 1.2 | 75 | 0.2 | YP-50F |
| A5 | 14 | 109 | 109 | 156 | 110 | 110 | 121 | 0.85 | 50 | 0.2 | YP-50F |
| A6 | 28 | 109 | 109 | 156 | 110 | 110 | 121 | 0.85 | 50 | 0.2 | YP-50F |
| A7 | 19 | 163.5 | 109 | 156 | 165 | 110 | 121 | 0.85 | 75 | 0.2 | YP-50F |
| A8 | 28 | 163.5 | 109 | 156 | 165 | 110 | 121 | 1.2 | 75 | 0.2 | YP-50F |
| A9 | 9 | 109 | 109 | 336 | 110 | 110 | 230 | 1.2 | 50 | 0.2 | YP-50F |
| A10 | 9 | 109 | 109 | 236 | 110 | 110 | 190 | 1.2 | 50 | 0.2 | AB-520 |
| A11 | 9 | 109 | 109 | 336 | 110 | 110 | 230 | 1.2 | 50 | 0.2 | AB-520 |

FIG. 10

TABLE 2

| CELL | Weight of the cell core unit (g) | Packaged Cell Weight W/O Electrolyte (g) | Total Cell Weight With Electrolyte (g) | LIC SIZE (mm³) | Capacitance (F) | AC-ESR (mΩ) | DC-ESR (mΩ) | Specific Energy (Wh/kg) | Energy Density (Wh/L) | Max. Specific Power (kW/kg) | Usable Specific Power (kW/kg) |
|---|---|---|---|---|---|---|---|---|---|---|---|
| A1 | 58.6 | 66.6 | 115 | 110x110x5.3 | 1198 | 2.9 | 6.8 | 17.4 | 31.4 | 5.1 | 2.4 |
| A2 | 110.6 | 118.7 | 210.1 | 110x110x9.5 | 2262 | 1.5 | 3.5 | 18 | 33 | 5.4 | 2.6 |
| A3 | 162.7 | 166.3 | 300.8 | 110x110x13.7 | 3327 | 1 | 2.4 | 18.4 | 33.5 | 5.6 | 2.7 |
| A4 | 165.9 | 178 | 315.1 | 165x110x9.5 | 3393 | 1 | 2.4 | 18 | 32.9 | 5.4 | 2.6 |
| A5 | 72.1 | 80.1 | 136.6 | 110x110x5.7 | 1131 | 1.6 | 3.6 | 13.8 | 27.2 | 8.1 | 3.9 |
| A6 | 144.1 | 152.2 | 265.1 | 110x110x11 | 2262 | 0.8 | 1.8 | 14.2 | 28.3 | 8.4 | 4.0 |
| A7 | 146.7 | 158.8 | 273.7 | 165x110x7.6 | 2303 | 1 | 2.2 | 14 | 27.7 | 6.5 | 3.1 |
| A8 | 216.2 | 228.3 | 397.7 | 165x110x11 | 3393 | 0.7 | 1.6 | 14.2 | 28.3 | 6.4 | 3.1 |
| A9 | 64.3 | 72.4 | 138.4 | 110x110x6.6 | 1796 | 2.9 | 9.5 | 21.6 | 37.7 | 3.1 | 1.5 |
| A10 | 58.6 | 66.6 | 115 | 110x110x5.3 | 1892 | 2.9 | 6.9 | 27.5 | 49.6 | 5.1 | 2.4 |
| A11 | 64.3 | 72.4 | 138.4 | 110x110x6.6 | 2838 | 2.9 | 9.5 | 34.2 | 59.6 | 3.1 | 1.5 |

FIG. 11

TABLE 3

| CELL | Li Shape | Thickness of Li Films (μm) | LiHC Mass Ratio Percentage (mg/cm²) | Positive Electrode Active Material | Total Cell Weight (g) | LIC SIZE (mm³) | Capacitance (F) | DC-ESR (mΩ) | Specific Energy (Wh/kg) | Energy Density (Wh/L) | Max. Specific Power (kW/kg) | Max. Power Density (kW/L) |
|---|---|---|---|---|---|---|---|---|---|---|---|---|
| B1 | Square Pieces | 120-140 | 7.40% | Elite-C | 112.1 | 110×110×4.79 | 902 | 6.8 | 13.4 | 26.9 | 5.26 | 10.17 |
| B2 | Square Pieces | 120-140 | 7.30% | Elite-C | 112.3 | 110×110×4.65 | 887 | 3.2 | 13.2 | 26.3 | 4.32 | 8.53 |
| B3 | Square Pieces | 120-140 | 7.23% | Elite-C | 113.1 | 110×110×4.73 | 923 | 6.8 | 13.6 | 26.9 | 5.21 | 10.30 |
| B4 | Square Pieces | 120-140 | 7.53% | Elite-C | 112.9 | 110×110×4.71 | 928 | 7.5 | 13.7 | 27.1 | 4.71 | 9.33 |
| B5 | Square Pieces | 120-140 | 7.50% | Elite-C | 112.8 | 110×110×4.55 | 918 | 7.5 | 13.6 | 27.8 | 4.71 | 9.66 |
| B6 | Square Pieces | 120-140 | 7.11% | Elite-C | 114.5 | 110×110×4.54 | 923 | 6.6 | 13.4 | 28.0 | 6.33 | 11.11 |
| B7 | Square Pieces | 120-140 | 7.37% | Elite-C | 111.1 | 110×110×4.53 | 933 | 6.6 | 14.0 | 28.3 | 5.49 | 11.08 |
| B8 | Square Pieces | 120-140 | 7.21% | Elite-C | 109.3 | 110×110×4.65 | 918 | 6.6 | 14.0 | 27.4 | 5.58 | 10.85 |
| B9 | Square Pieces | 120-140 | 7.51% | Elite-C | 112.3 | 110×110×4.80 | 925 | 6.6 | 13.7 | 26.5 | 5.44 | 10.50 |
| B10 | Square Pieces | 120-140 | 7.40% | CEP21KS | 112.2 | 110×110×4.81 | 1257 | 6.8 | 19.1 | 36.8 | 5.27 | 10.15 |
| B11 | Square Pieces | 120-140 | 7.40% | YP-50F | 112.1 | 110×110×4.76 | 993 | 7.0 | 14.8 | 28.7 | 5.65 | 10.99 |
| B12 | Li Strips | 45 | 10.99% | Elite-C | 108.3 | 110×110×4.82 | 902 | 7.5 | 13.6 | 26.6 | 4.92 | 9.53 |
| B13 | Li Strips | 45 | 7.94% | Elite-C | 115.0 | 110×110×5.23 | 933 | 7.5 | 13.6 | 25.0 | 4.62 | 8.40 |
| B14 | Li Strips | 45 | 9.93% | Elite-C | 108.7 | 110×110×5.05 | 887 | 9.2 | 13.6 | 24.2 | 4.00 | 7.11 |

FIG. 12

HIGH PERFORMANCE LITHIUM-ION CAPACITOR LAMINATE CELLS

FIELD OF THE INVENTION

The present invention relates to lithium-ion capacitor laminate cells that include positive electrodes, negative electrodes and organic solvent electrolyte with lithium salt. More particularly, the lithium-ion capacitor laminate cells of the present invention, wherein the negative electrode is pre-doped with sufficient lithium ions by placing the lithium sources which are lithium powder known as SLMP or thin lithium films on the surface of the negative electrodes, have considerably high performance in energy density, power density and cycle life.

BACKGROUND OF THE INVENTION

People are always pursuing more efficient energy storage devices which can provide high energy density, good power performance and long cycle life. The electrochemical double-layer capacitor (EDLC) contains two symmetrical activated carbon electrodes with high surface area and porous structure. Although the EDLC has the characteristics of high power and long cycle life, the energy density of an EDLC is less than 10% of that of a lithium-ion (Li-ion) battery (LIB), which restricts its application in the field of hybrid electric vehicles (HEVs), electric vehicles (EVs) and other large-scale energy storage systems.

Therefore, in recent years considerable research has been focused on the development of a high energy density EDLC. Among all the energy storage systems that have been investigated and developed in the last few years, Li-ion Capacitors (LICs) have emerged to be one of the most promising because LICs achieve higher energy density than conventional EDLCs, and better power performance than LIBs as well being capable of long cycle life. LICs contain a "pre-lithiated" LIB anode electrode and an EDLC cathode electrode. Fuji Co. proposed using a separate lithium foil as the third electrode to pre-lithiate the anode electrodes and the first company which utilized a third electrode of lithium metal to pre-lithiate the anode and produce the LICs was JM Energy and the energy density of their LICs reached approximately 10 Wh $kg^{-1}$ with very stable long cycle life.

Stabilized lithium metal powder (SLMP) is a pioneering and revolutionary material and technology developed by FMC that is able to provide electrochemically energy carrier as rechargeable lithium atom for all types of lithium based energy devices. SLMP is comprised of spherical particles with controlled particle size and surface area. SLMP is made by agitating a mixture of molten lithium metal in a hydrocarbon oil at dispersion speeds. The thickness and chemistry of the protective coating layer can be tailored and engineered based on user preference. SLMP can offer a capacity as high as 3600 mAh $g^{-1}$ and still can be safely introduced to the energy storage devices in a dry room atmosphere. SLMP has been widely used in the LIB energy storage system for pre-lithation of the anode electrodes including hard carbon, soft carbon, graphite and nano-silicon electrodes.

Another lithium source that is used widely in lithium-metal battery is the thin lithium films as the negative electrodes. Among all the energy storage devices, one of the most spotlighted high performance cutting-edge batteries is the lithium-metal battery, which can be classified as lithium-ion or lithium sulfur batteries. The reason for choosing lithium as anode is that the density of lithium is as low as 0.54 $g/cm^3$ and the standard reduction potential is low (−3.045 V SHE (Standard hydrogen electrode)), which enables lithium to be promising high energy density electrode material.

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. In addition, it is to be understood that the phraseology and terminology employed herein are for the purpose of description and should not be considered to be, or regarded as limiting.

SUMMARY OF THE INVENTION

The principle advantage of the present invention is to provide a lithium-ion capacitor (LIC) laminate cell which has excellent characteristics in the cycling ability, while also maintaining high energy density and power density, and having low internal resistance.

Another advantage of this invention is to provide a lithium-ion capacitor (LIC) laminate cell having a positive electrode, a negative electrode and an organic solvent electrolytic solution with lithium salt as the electrolyte, wherein the negative electrode is pre-doped with sufficient lithium ions by placing lithium sources including lithium powder called SLMP and thin lithium films on the surface of negative electrodes.

Another advantage of this invention is to provide an LIC laminate cell wherein the positive electrode active material is preferred to be activated carbon, carbon black, activated carbon/carbon black mixed (AC/CB) or activated carbon/carbon-nanotube composite (AC/CNT), and the negative electrode active material is preferred to be graphite, hard carbon, soft carbon and $Li_4Ti_5O_{12}$ or any possible mix of above material.

Another advantage of this invention is to provide an LIC laminate cell wherein the binder for manufacturing the positive electrodes used in this LIC laminate cell is preferred to be polytetrafluoroethylene (PTFE).

Another advantage of this invention is to provide an LIC laminate cell wherein the total thickness of the positive electrode, which includes the thickness of double-side conductive material pre-coated aluminum foil and the thickness of the double-side active material layers, is 96 μm to 356 μm.

Another advantage of this invention is to provide an LIC laminate cell wherein the total thickness of the negative electrode, which includes the thickness of double-side conductive material pre-coated copper foil and the thickness of the double-side active material layers, is 66 μm to 316 μm.

Another advantage of this invention is to provide an LIC laminate cell wherein the mass per unit area of the SLMP loaded onto one side surface of the negative electrode is preferred to be 0.3 $mg/cm^2$ to 3 $mg/cm^2$.

Another advantage of this invention is to provide an LIC laminate cell wherein the thin lithium films loaded onto one side surface of the negative electrode is preferred to be square Li pieces, round Li pieces and Li strips.

Another advantage of this invention is to provide an LIC laminate cell wherein the thickness of the thin lithium films loaded onto one side surface of the negative electrode is preferred to be 5 to 150 um.

Another advantage of this invention is to provide an LIC laminate cell wherein the mass ratio percentage of the thin lithium films loaded onto one side surface of the negative electrode to the one side negative electrode active layer is preferred to be 3% to 20%.

Another advantage of this invention is to provide an LIC laminate cell wherein the length of the positive and negative electrodes is 30 mm to 180 mm and the width of the positive and negative electrodes is 30 mm to 120 mm.

Another advantage of this invention is to provide an LIC laminate cell wherein the length and width of the negative electrode is 0.5 mm to 3 mm larger than that of the positive electrode.

Another advantage of this invention is to provide an LIC laminate cell wherein the number of the positive electrode sheets is preferred to be 4 to 30 and the number of the negative electrode sheets is always 1 more than that of the positive electrode sheets.

Another advantage of this invention is to provide an LIC laminate cell wherein the material of the separator is cellulose, polypropylene (PP) and polyethylene (PE) based material.

Extensive research efforts by the inventors of the present invention resulted in successfully presenting the following unexpected solution to the problem of creating a lithium-ion capacitor (LIC) laminate cell which is excellent in the cycling ability, having high energy density and power density and having low internal resistance. In the preferred embodiment of the invention the LIC laminate cell system, the negative electrode is pre-doped with lithium ions by applying lithium sources including SLMP and thin Li films onto the surface of the negative electrodes.

There are many factors which will influence the electrochemical performance and capacity of the laminate cells when pre-doped in this manner. These factors include: (1) the materials used for the positive and negative electrodes; (2) the method of manufacturing the positive and negative electrodes; (3) the thickness of the positive and negative electrodes; (4) the mass per unit area of the SLMP loaded on surface of negative electrode the shapes of thin Li films loaded on surface of negative electrode; the thickness of the thin Li films loaded on surface of negative electrodes; the mass ratio percentage of the thin lithium films loaded onto one side surface of the negative electrode to the one side negative electrode active layer; (5) the length and width of the positive and negative electrodes; (6) the tab width and thickness for the laminate cell; and (7) the numbers of the positive and negative electrode sheets in the laminate cell and the material of the separator for the laminate cell.

The present invention may be summarized as follows: according to the LIC laminate cell of present invention, there is provided a LIC laminate cell including a positive electrode, a negative electrode and an organic solvent electrolytic solution with lithium salt as the electrolyte, wherein the negative electrode is pre-doped with sufficient lithium ions by applying lithium sources including lithium powder called SLMP and thin lithium films on the surface of the negative electrode.

In the LIC laminate cell of the present invention, it is preferable that the positive electrode active material is activated carbon, carbon black, activated carbon/carbon black mixed (AC/CB) or activated carbon/carbon-nanotude composite (AC/CNT). In the LIC laminate cell of the present invention, the negative electrode active material is preferred to be graphite, hard carbon, soft carbon and $Li_4Ti_5O_{12}$ or any possible mix of above material.

In the LIC laminate cell of the present invention, the binder for manufacturing the electrodes is polytetrafluoroethylene (PTFE).

In the LIC laminate cell of the present invention, the total thickness of the positive electrode, which includes the thickness of double-side conductive material pre-coated aluminum foil and the thickness of the double-side active material layers, is 96 µm to 356 µm. In the LIC laminate cell of the present invention, the total thickness of the negative electrode, which includes the thickness of double-side conductive material pre-coated copper foil and the thickness of the double-side active material layers, is 66 µm to 316 µm.

In the LIC laminate cell of the present invention, the mass per unit area of the SLMP loaded onto one side surface of the negative electrode is preferred to be 0.3 $mg/cm^2$ to 3 $mg/cm^2$.

In the LIC laminate cell of the present invention, the thin lithium films loaded onto one side surface of the negative electrode is preferred to be square Li pieces, round Li pieces and Li strips.

In the LIC laminate cell of the present invention, the thickness of the thin lithium films loaded onto one side surface of the negative electrode is preferred to be 5 to 150 um.

In the LIC laminate cell of the present invention, the mass ratio percentage of the thin lithium films loaded onto one side surface of the negative electrode to the one side negative electrode active layer is preferred to be 3% to 20%.

In the LIC laminate cell of the present invention, the length of the positive and negative electrodes is 30 mm to 180 mm and the width of the positive and negative electrodes is 30 mm to 120 mm; It is preferred that the length and width of the negative electrode is 0.5 mm to 3 mm larger than that of the positive electrode for the LIC laminate cell.

In the LIC laminate cell of present invention, the tab width is preferred to be 0.15 to 0.45 of the length of the negative electrode and the tab thickness is preferred to be 0.05 mm to 0.5 mm.

In the LIC laminate cell of present invention, the number of the positive electrode sheets is preferred to be 4 to 30; the number of the negative electrode sheets is always 1 more than that of the positive electrode sheets in the LIC laminate cell.

It is preferable that the material of the separator is cellulose, polypropylene (PP) and polyethylene (PE) based material in the LIC laminate cell of the present invention.

According to the present invention, there is provided a LIC laminate cell having high energy density, high power density, low internal resistance and long life performance.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE DRAWINGS

The accompanying drawings, which are incorporated in and form a part of this specification, illustrate embodiments of the invention and together with the description, serve to explain the principles of this invention.

FIG. 10 represents TABLE 1 which illustrates the characteristics of cells A1 through A11 with regard to the number of positive sheets, positive and negative electrode size, SLMP loading mass Al/Ni tab size and positive electrode active material used.

FIG. 11 represents TABLE 2 which illustrates the characteristics of cells A1 through A11 with regard to weight of the cell core, packaged cell weight without electrolyte, total cell weight with electrolyte, LIC size, capacitance, AC-ESR, DC-ESR specific energy, energy density, maximum specific power and usable specific power.

FIG. 12 represents TABLE 3 which illustrates the characteristics of example cells B1 through B11 with regard to mass ratio percentage of the thin lithium films loaded onto one side surface of the negative electrode to the one side negative electrode active layer, type of positive electrode material, weight of the packaged cell, LIC size, capacitance, DC-ESR, specific energy, energy density, maximum specific power and maximum power density.

DETAILED DESCRIPTION OF EMBODIMENTS

Figure 1:
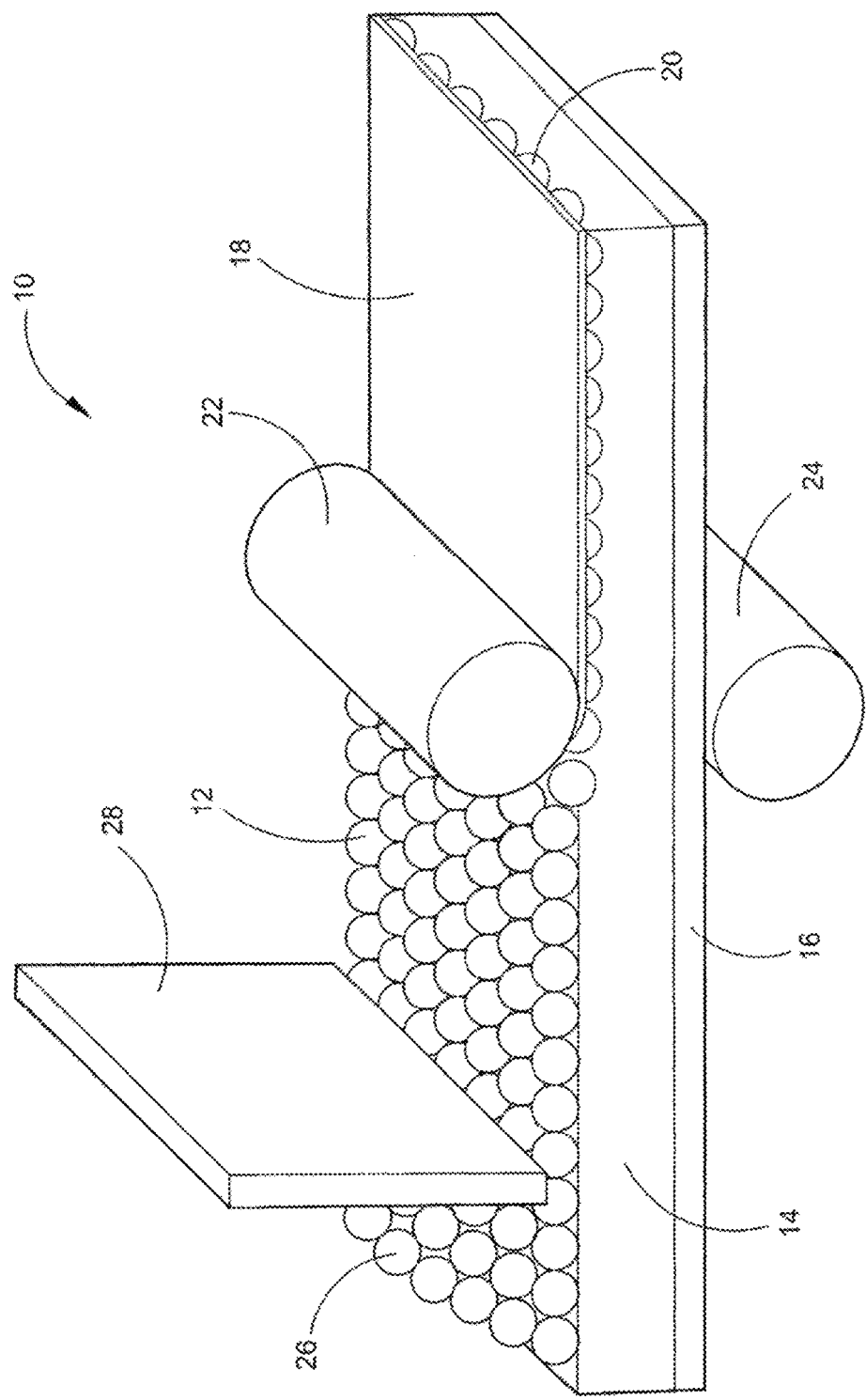
FIG. 1 is representational view of the mechanical aspects of the coating process of stabilized lithium metal powder (SLMP) on the surface of a negative electrode.
Figure 2:
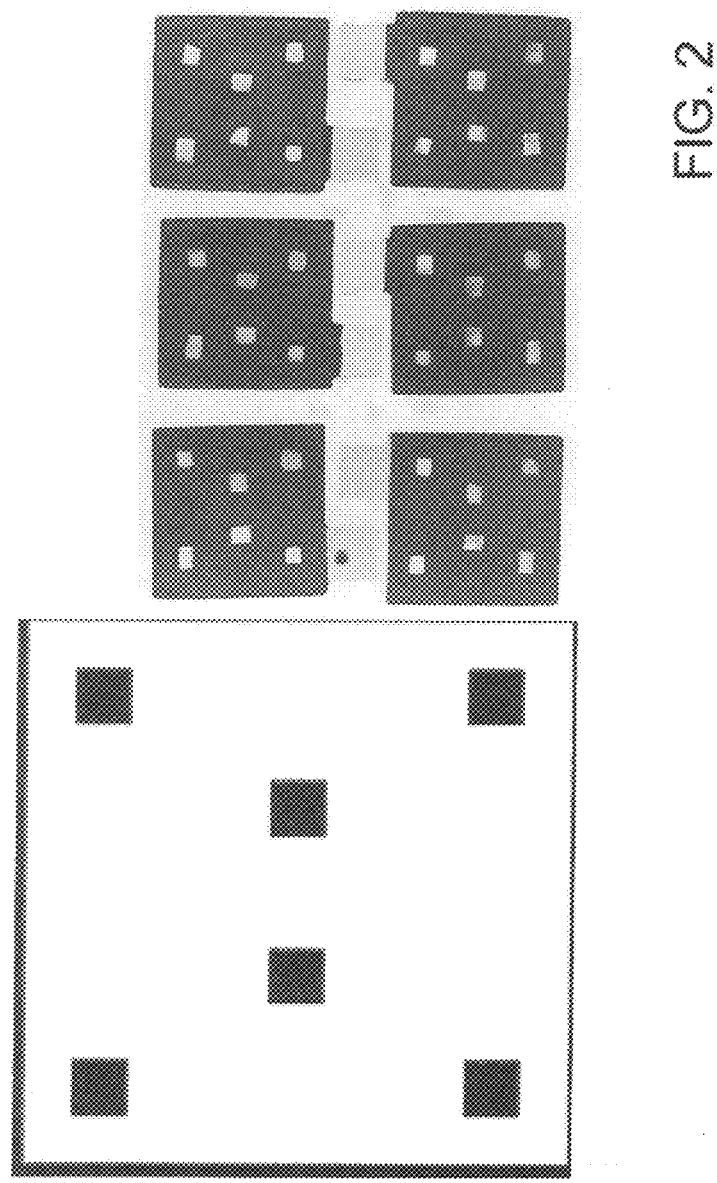
FIG. 2 depicts a 3%-4% Li film mass loading percentage with 120 μm to 140 μm square Li films.

For a fuller understanding of the nature and objects of the invention, reference should be had to the following detailed description taken in conjunction with the accompanying drawings wherein similar parts of the invention are identified by like reference numerals. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The LIC laminate cell of the present invention includes positive electrodes, negative electrodes with lithium sources including lithium powder called SLMP or thin lithium films applied on surface, and an organic electrolyte solution with lithium salt that are housed in a container, for example a metal can container or a laminated outer container.

There is seen in FIG. 1 a representational view of the mechanical aspects of the coating process 10 of stabilized lithium metal powder (SLMP) on the surface of a negative electrode. The coating process starts with adding a layer of SLMP later 12 to a hard carbon surface 14 which is placed on a copper foil/plate 16. A blade 28 then passes over the SLMP layer 12, removing excess SLMP 26, before rollers, comprising upper roller 22 and lower roller 24 act to substantially flatten out the SLMP layer 12 to create essentially a flat upper SLMP surface 18 and a lower SLMP surface 20.

The LIC laminate cell of the present invention generally has a cell core unit formed by stacking positive electrodes and negative electrodes through separators in an outer container, for example a laminated outer container. The negative electrodes are pre-doped by pressing the lithium sources including the SLMP or thin Li films on the surface of the negative electrodes as shown in FIG. 1 to FIG. 6. The "pre-dope" roughly represents a phenomenon in which the lithium ions enter into the negative electrode active material. The lithium powder SLMP or thin films are the lithium ion supply source to pre-dope the negative electrodes. The lithium source loading process can make sure that the negative electrodes contain uniform lithium on the surface so that when the electrolyte is filled, the negative electrodes can be smoothly and uniformly pre-doped with lithium ions.

Figure 7:
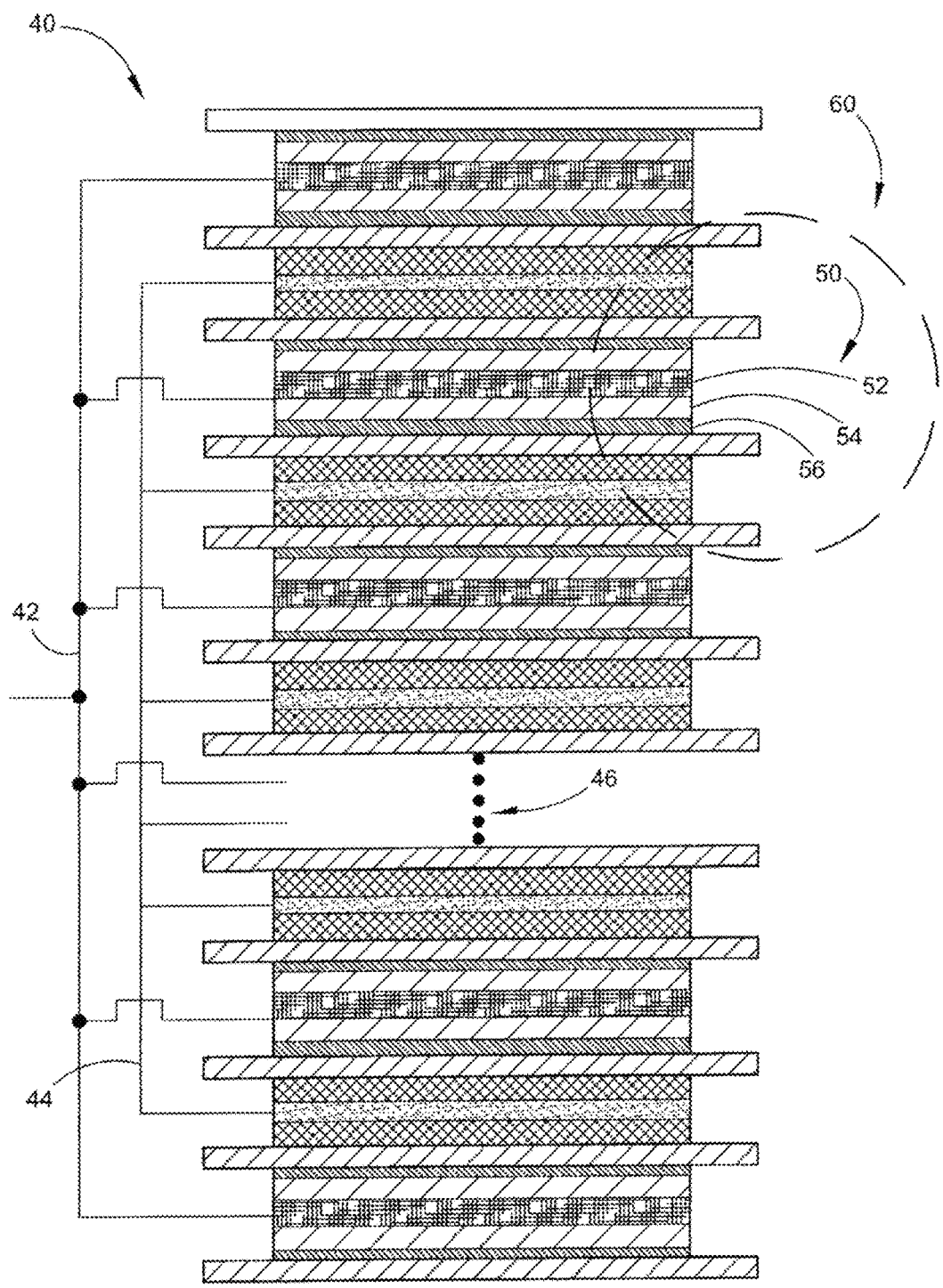
FIG. 7 is a schematic representation of the stacking cell core for the LIC laminate cell, showing detail of the arrangement and materials used in construction.

Referring now to FIG. 7, there is shown a representation of the stacking cell core for the LIC laminate cell 40. The LIC stacking cell core unit includes a Ni anode 42 having a total of N+1 number of sheets therein, and an Al cathode 44 having N number of sheets therein. Between the two is a region where there is located N-5 sheets of positive electrodes 46. In the unit cell 50 shown in greater detail in FIG. 8 below, depicting a Cu layer 52, a HC layer 54 and a lithium source (SLMP or various shapes of thin lithium films) layer 56 between two separators. For greater detail see the enlarged view of the cell unit 60 in FIG. 8 below.

In the LIC laminate cell according to the present invention, the cell core unit is configured as shown in FIG. 7. It can be seen from FIG. 7 that the Cu and Al substrates are welded to nickel (Ni) and aluminum (Al) current collector tabs, respectively. After the stacking and welding processes, the electrode units are housed in a container, for example an aluminum laminated formed case that is suitable for the size of the electrode units and three-side heat sealing process will be applied. Then the desired amount of electrolyte were filled into the LIC laminated cell to soak the cell to initiate the pre-doping process by intercalation of the lithium into the negative electrodes. After the cell has been soaked for enough time, then the vacuum sealing process will be applied to the cell in order to remove the excess gas trapped in the LIC laminate cell. As a result, such a constitution can be achieved for the LIC laminated cell.

Figure 8:
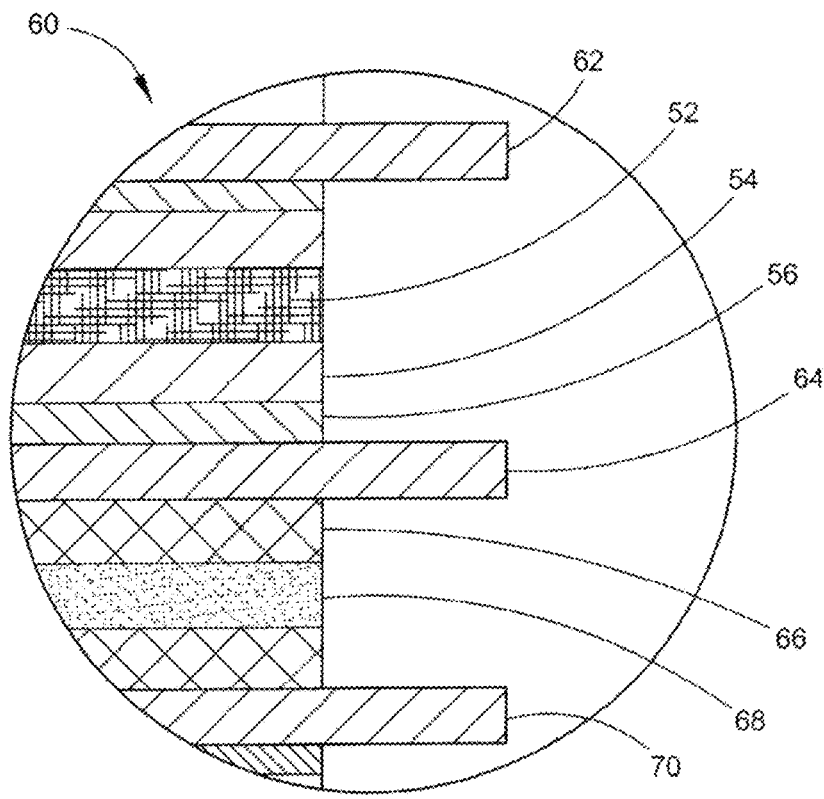
FIG. 8 is an enlarged schematic representation of a portion of the stacking cell core, illustrating greater detail, for the LIC laminate cell, as shown in FIG. 7.

Referring now to FIG. 8, there is shown an enlarged schematic representation of a portion of the stacking cell core 60, illustrating the construction of the component parts in greater detail, for the LIC laminate cell, as shown in FIG. 7. The layers of the unit cell 60 lie between lithium separators 62, 64 and 70. Above lithium separator is a Cu layer 52 located above a HC layer 54, which is located above the lithium layer 56 above the lithium separator 64. Below lithium separator 64 is located an AC layer 66 above an Al layer 68, all of which lies above lithium separator 70.

Each component constituting the LIC laminated cell according to the present invention will next be described.

Active Material for the Positive and Negative Electrodes

As the positive electrode active material, it should be capable of being reversibly adsorb or desorb with lithium ion and anions in the electrolyte such as tetrafluoroborate. One of the examples for such material is the activated carbon powders. The specific surface area of the activated carbon is 1,500 $m^2/g$ to 2,800 $m^2/g$, preferably 1,600 $m^2/g$ to 2,400 $m^2/g$. It is preferred that the diameter of 50% accumulated volume (D50) (average particle diameter) of the activated carbon should be 2 μm to 10 μm. It is particularly more preferred from 3 μm to 8 μm so that the energy density of the LIC laminate cell can be further improved. Some other examples for such material can be carbon black and activated carbon/carbon-nanotubes composite (AC/CNTs).

As the negative electrode active material, it should be capable of being reversibly intercalated and de-intercalated with lithium ions. Examples for such material are the graphite-based composite particles, non-graphitizable carbon (hard carbon, (HC)) and graphitizable carbon (soft carbon, (SC)). In the present invention, as the negative electrode active material, the HC and SC particles are preferred because they can achieve higher performance in power performance and the cycling stability than graphite material. However, the graphite material can achieve higher energy performance for the LIC. In order to improve the power performance of the LIC laminate cell, it is preferable that HC and SC having particle size that satisfies a diameter of 50% accumulated volume (D50) within a range of 1.0 to 10 μm; more preferably within a range of 2 to 6 μm are used as the negative electrode active material.

It should be noted that it is difficult to produce the HC and SC particles having a diameter of 50% accumulated volume (D50) of less than 1.0 μm. When the HC and SC particles have a diameter of 50% accumulated volume (D50) of more than 10 μm, a LIC laminate cell which has a sufficiently small internal resistance is difficult to be achieved. It is preferred that the negative electrode active material has a specific surface area of 0.1 to 200 $m^2/g$, and 0.6 to 60 $m^2/g$ is more preferred. The reasons for setting such a range are that the resistance of the LIC laminate cell can be high if the specific surface area of the negative electrode active material is less than 0.1 $m^2/g$ and the irreversible capacity of the LIC laminate cell during charging can be high if the specific surface area of the negative electrode active material is more than 200 $m^2/g$.

Method of Manufacturing the Positive and Negative Electrodes

In the LIC laminate cell of present invention, it is preferred that the positive electrode used is an electrode including a sheet-shaped metal current collector with double-side coated conductive material and electrode layers composed of the positive electrode active material and the binders, and formed on both surfaces of the current collector. The negative electrode used in this LIC laminate cell of present invention is an electrode including a sheet-shaped metal current collector with double-side coated conductive material and electrode layers composed of the negative electrode active material and the binders, and formed on both surfaces of the current collector.

The current collector used in the positive electrode can be made up by aluminum, stainless steel and etc. Aluminum is preferred. The current collector used in the negative electrode can be made up by stainless steel, copper, nickel and etc. Copper is preferred. It is preferred that the thicknesses of the current collectors in positive and negative electrodes are 6 to 50 μm, 10 to 25 μm is preferred. This range enables that the positive and negative electrodes obtained have high strength and it is easy for the conductive coating material slurry to be applied. The conductive material coating accuracy, and the volumetric energy density and gravimetric energy density can be improved. Both surfaces of the positive and negative current collectors were coated with carbon conductive coating slurry by a spraying/coating method and dried thereby to obtain the current collectors that have a conductive layer for both positive and negative electrodes. The carbon conductive coating thickness on one side of the current collector is 1 to 20 μm, 3 to 12 μm is preferred.

The positive and negative electrodes in this invention are made of the electrode active material mentioned above. Specifically, a positive/negative electrode active material powder, a binder and some solvent are dispersed into the blender to be mixed to obtain a dry powder mixture. The percentage of the binder added in the slurry is preferred to be 2% to 12%. The binder used in this free-standing films is preferred to be polytetrafluoroethylene (PTFE). Then the dry powder mixture is pressed through the high temperature mill rollers to obtain the free-standing films which are the positive/negative electrode active material layers. The thickness of the positive free-standing film is 30 to 200 μm, 50 to 160 μm is preferred, and the thickness of the negative free-standing film is 20 to 160 μm, 35 to 120 μm is preferred. Then the free-standing films are laminated onto the both sides of the carbon conductive pre-coated current collector by high temperature hot mill rollers to form the final positive and negative electrodes for the LIC laminate cells.

In the LIC laminate cell of the present invention, the total thickness of the positive electrode, which includes the thickness of double-side conductive material pre-coated current collector and the thickness of the double-side active material layers, is preferred to be 96 μm to 356 μm. In the LIC laminate cell of the present invention, the total thickness of the negative electrode, which includes the thickness of double-side conductive material pre-coated current collector and the thickness of the double-side active material layers, is preferred to be 66 μm to 316 μm.

Methods of Pre-Doping the Lithium-Ion into the Negative Electrodes

Method 1: SLMP Loading Mass on Surface of Negative Electrodes

During the assembling process of the LIC laminate cell of the present invention, after all the negative electrodes are dried in a vacuum oven at 120° C. for overnight, the SLMP is applied onto the surface of all the prefabricated negative electrodes by doctor blade method as shown in FIG. 1 or powder scatter method in a dry room which has a Dew Point lower than −30° C. Then the SLMP coated negative electrodes are pressed under the roll in the room temperature. The pressure should be 35 $kg/cm^2$ to 60 $kg/cm^2$. The SLMP, which is purchased from FMC Lithium, is Li powder with a passivation layer at surface and the average size of the Li powder is about 40 μm. In the LIC laminate cell of the present invention, the mass per unit area of the SLMP loaded onto one side surface of the negative electrode is preferred to be 0.3 mg/cm$^2$ to 3 mg/cm$^2$. After all the SLMP is pressed onto the anode electrode, there should be a uniform thin layer of SLMP on the surface of the negative electrode.

Method 2: Thin Lithium Films Loading Mass on Surface of Negative Electrodes

The lithium films with desired thickness are cut down into designated size. The thickness of the loaded lithium films can be 0 to 750 μm, 5 to 150 μm is preferred. The lithium films with various designated sizes as shown in FIG. 2 to FIG. 6 are pressed down onto the surfaces of both sides of the negative electrodes by hydraulic or roller press. The amount of pressure applied will depend on the thickness of the lithium films. The shapes of the thin lithium films are preferred to be square Li pieces, round Li pieces and Li strips. In the LIC laminate cell of the present invention, the mass ratio percentage of the thin lithium films loaded onto one side surface of the negative electrode to the one side negative electrode active layer is preferred to be 3% to 20%.

Punched Electrode Size Before Stacking and Tab Size

Figure 9:
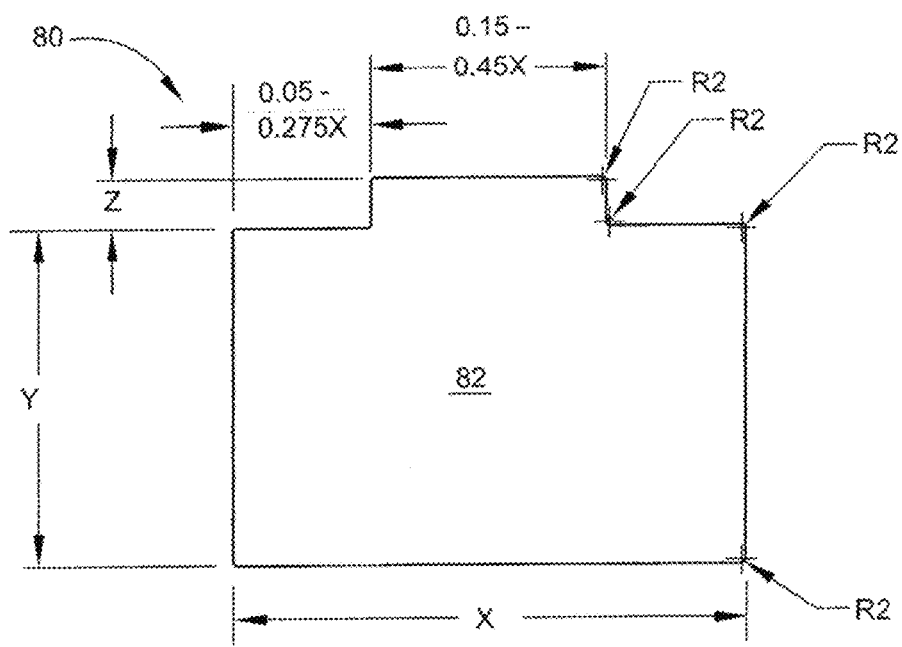
FIG. 9 is a schematic of the punched electrode size for the LIC laminate cell, showing relative proportions of the dimensions of the cell.

Referring now to FIG. 9 there is depicted a schematic of the punched electrode size, with proportional dimensions, for the LIC laminate cell 80. The relative sizes X, Y and Z, and the relative proportions for those dimensions is shown for the punched electrode 82.

In the LIC laminate cell of present invention, all the electrodes including the positive electrodes and negative electrodes with lithium loaded on surface should be punched into designated size with some additional current collector tabs as shown in FIG. 9 before stacking into a cell core unit. In FIG. 9, the X value represents the length of the electrode, the Y value represents the width of the electrode and Z value represents the length of the current collector tab. The size of the electrodes decides the final size of the LIC laminate cell because the outside container should match the size of the electrodes. It is preferred that the length and width of the negative electrode is 0.5 mm to 3 mm larger than that of positive electrode for the LIC laminate cell. In the LIC laminate cell of the present invention, it is preferred that the length of the punched positive and negative electrodes is 30 mm to 180 mm (180≥X≥30) and the width of the punched positive and negative electrodes is 30 mm to 120 mm (120≥Y≥30). The length of current collector tab is 12 mm to 25 mm (25≥Z≥12). In the LIC laminate cell of present invention, the tab width is preferred to be 0.15 to 0.45 of the length of the negative electrode and the tab thickness is preferred to be 0.05 mm to 0.5 mm.

LIC Laminate Cell Core Unit

In the LIC laminate cell according to the present invention, the LIC laminate cell core unit is configured as shown in FIG. 7. It can be seen from FIG. 7 that the Cu and Al substrates are welded to nickel (Ni) and aluminum (Al) current collector tabs, respectively. This cell core unit is configured by stacking a positive electrode having a positive electrode active material layer formed on a positive electrode current collector, a first separator, a negative electrode having a negative electrode active material layer formed on a negative electrode current collector, and a second separator in this order; the surface of all the negative electrodes are loaded by lithium. It is preferred that both top and bottom of the stacking cell core unit are the negative electrodes so that the number of the negative electrode sheets is always 1 more than that of the positive electrode sheets in the LIC laminate cell as shown in FIG. 7; It is also preferred that the number of the positive electrode sheets in the LIC laminate cell of the present invention is 4 to 30 (30≥N≥4). The separators with cellulose, polypropylene (PP) and polyethylene (PE) based material are preferred to be used in the LIC laminate cell of present invention.

EXAMPLES

The present invention will be described in more details by the following examples. It should be understood that the present invention is not limited to the examples to be described hereunder.

Example 1—A1

Commercial active materials were used for both the positive and negative electrodes as received. The positive electrode (PE) was prepared by coating a slurry mixture of activated carbon (AC) and polytetrafluoroethylene (PTFE) as a binder by the mass ratio of 94:6 on an Al foil substrate (Exopack™, 20 mm in thickness). The AC material is YP-50F (Kuraray Chemical Co., Japan) which has a surface area of about 1700 m$^2$/g. The slurry mixture of the negative electrode (NE) was made of hard carbon (HC, Carbotron P (J), Kureha Japan) and PTFE as a binder by the mass ratio of 96:4. After the slurry was prepared, it was coated onto a Cu foil substrate that had a thickness of 10 μm. Then the electrodes were dried at 160° C. for 2 h in oven with flowing air.

After all the electrodes were dried, a hot-roll pressing was applied to the AC and HC electrode sheets to make them into the desired thickness (total thickness including the double-side carbon conductive coated Al/Cu and the double-side electrode active material layers), 236 μm for PE and 190 μm for NE. All the electrode sheets were kept in the dry room and punched out into electrodes with desired electrode size. The size for the positive electrode is 109×109 mm with 50 mm width and 15 mm length tab; the size for the negative electrode is 110×110 mm with 50 mm width and 15 mm length tab.

All the electrodes were dried again at 160° C. for overnight in a vacuum oven and then the stabilized lithium metal powder (SLMP) was applied onto the surface of all the pre-fabricated HC anode electrodes by doctor blade method and then roll-pressing in a dry room as shown in FIG. 1 before being assembled into the pouch cell. The SLMP, which is purchased from FMC Lithium, is Li powder with a passivation layer at surface and the average size of the Li powder is about 40 μm. The mass per unit area of the SLMP loaded is 1.2 mg/cm$^2$. After the SLMP loadings on anode, all the punched electrodes were stacked to form a cell core unit as shown in FIG. 7.

The number of the positive electrode sheets in LIC laminate cell A1 is 9 and the number of the negative electrode sheets in A1 is 10, respectively. It can be seen from FIG. 7 that the Cu and Al substrates were ultrasonic welded to nickel (Ni) and aluminum (Al) current collector tabs with a thickness of 0.2 mm and a width of 50 mm, respectively. After the stacking and welding processes, the cell core was housed in an aluminum laminated formed case that is suitable for the size of the electrodes. Then the vacuum heat sealing process was applied to the case with the cell core in order to remove the excess gas trapped in the cell after the pouch cells were filled with electrolyte.

The separator used was TF40-30 (NKK Nippon Kodoshi Corp., Japan). The electrolyte was 1 M LiPF$_6$ in ethylene carbonate (EC):dimethyl carbonate (DMC) at a ratio of 1:1 by weight (LP30, SelectiLyte™, Merck Electrolyte). After filling electrolyte and the vacuum sealing process, the LIC laminate cell A1 was allowed to stand for 24 hours to let the process of SLMP intercalating process complete. Then the LIC laminate cell A1 was charged and discharged under a constant current 10 A from 4 V to 2 V to obtain the capacitance and ESR values.

The specific energy, energy density, usable power and maximum power are calculated based on the following formulas:

Specific Energy:

$$E_s = \frac{C \times (V_{max}^2 - V_{min}^2)}{7.2 \times \text{mass}}$$

Energy Density:

$$E_D = \frac{C \times (V_{max}^2 - V_{min}^2)}{7.2 \times \text{volume}}$$

Maximum Specific Power:

$$P_{max} = \frac{V^2}{4 \times ESR_{DC} \times \text{mass}}$$

Usable Power (Per IEC62391-2):

$$P_d = \frac{0.12 V^2}{ESR_{DC} \times \text{mass}}$$

The summary of the cell components and parameters for LIC laminate cell A1 is shown in FIG. 10 representing TABLE 1 described below and the results of the evaluation are also in FIG. 11 representing TABLE 2 described below. Referring now to FIG. 10, TABLE 1 is shown which illustrates the characteristics of example cells A1 through A11 with regard to the number of positive sheets, positive and negative electrode size, SLMP loading mass Al/Ni tab size and positive electrode active material used. FIG. 11 represents TABLE 2 which illustrates the characteristics of cells A1 through A11 with regard to weight of the cell core, packaged cell weight without electrolyte, total cell weight with electrolyte, LIC size, capacitance, AC-ESR, DC-ESR specific energy, energy density, maximum specific power and usable specific power, all again for example cells A1 through A11. Explanation of those example cells continues below.

Example 2—A2

An LIC laminate cell for a test and evaluation (hereinafter referred to as "A2") was produced in the same manner as in Example 1 (A1) except that the number of the positive electrode sheets in the stacking cell core unit is changed from 9 to 17 and the number of the negative electrode sheets in the cell core unit is changed from 10 to 18 in the production of the LIC laminate cell A2.

The summary of the cell components and parameters for LIC laminate cell A2 is shown in FIG. 10 representing TABLE 1 described below and the results of the evaluation are also in FIG. 11 representing TABLE 2 described below.

Example 3—A3

An LIC laminate cell for a test and evaluation (hereinafter referred to as "A3") was produced in the same manner as in Example 1 (A1) except that the number of the positive electrode sheets in the stacking cell core unit is changed from 9 to 25 and the number of the negative electrode sheets in the cell core unit is changed from 10 to 26 in the production of the LIC laminate cell A3.

The summary of the cell components and parameters for LIC laminate cell A3 is shown in FIG. 10 representing TABLE 1 described below and the results of the evaluation are also in FIG. 11 representing TABLE 2 described below.

Example 4—A4

An LIC laminate cell for a test and evaluation (hereinafter referred to as "A4") was produced in the same manner as in Example 2 (A2) except that the length of the positive electrode is changed from 109 mm to 163.5 mm, the length of the negative electrode is changed from 110 mm to 165 mm and the width of the tab is changed from 50 mm to 75 mm in the production of the LIC laminate cell A4.

The summary of the cell components and parameters for LIC laminate cell A4 is shown in FIG. 10 representing TABLE 1 described below and the results of the evaluation are also in FIG. 11 representing TABLE 2 described below.

Example 5—A5

An LIC laminate cell for a test and evaluation (hereinafter referred to as "A5") was produced in the same manner as in Example 1 (A1) except that the number of the positive electrode sheets in the stacking cell core unit is changed from 9 to 14, the number of the negative electrode sheets in the cell core unit is changed from 10 to 15, the thickness of the positive electrode is changed from 236 μm to 156 μm, the thickness of the negative electrode is changed from 190 μm to 121 μm and the mass per unit area of SLMP loaded is changed from 1.2 mg/cm$^2$ to 0.85 mg/cm$^2$ in the production of the LIC laminate cell A5.

The summary of the cell components and parameters for LIC laminate cell A5 is shown in FIG. 10 representing TABLE 1 described below and the results of the evaluation are also in FIG. 11 representing TABLE 2 described below.

Example 6—A6

An LIC laminate cell for a test and evaluation (hereinafter referred to as "A6") was produced in the same manner as in Example 5 (A5) except that the number of the positive electrode sheets in the stacking cell core unit is changed from 14 to 28 and the number of the negative electrode sheets in the cell core unit is changed from 15 to 29 in the production of the LIC laminate cell A6.

The summary of the cell components and parameters for LIC laminate cell A6 is shown in FIG. 10 representing TABLE 1 described below and the results of the evaluation are also in FIG. 11 representing TABLE 2 described below.

Example 7—A7

An LIC laminate cell for a test and evaluation (hereinafter referred to as "A7") was produced in the same manner as in Example 5 (A5) except that the number of the positive electrode sheets in the stacking cell core unit is changed from 14 to 19, the number of the negative electrode sheets in the cell core unit is changed from 15 to 20, the length of the positive electrode is changed from 109 mm to 163.5 mm, the length of the negative electrode is changed from 110 mm to 165 mm and the width of the tab is changed from 50 mm to 75 mm in the production of the LIC laminate cell A7.

The summary of the cell components and parameters for LIC laminate cell A7 is shown in FIG. 10 representing TABLE 1 described below and the results of the evaluation are also in FIG. 11 representing TABLE 2 described below.

Example 8—A8

An LIC laminate cell for a test and evaluation (hereinafter referred to as "A8") was produced in the same manner as in Example 7 (A7) except that the number of the positive electrode sheets in the stacking cell core unit is changed from 19 to 28 and the number of the negative electrode sheets in the cell core unit is changed from 20 to 29 in the production of the LIC laminate cell A8.

The summary of the cell components and parameters for LIC laminate cell is shown in FIG. 10 representing TABLE 1 described below and the results of the evaluation are also in FIG. 11 representing TABLE 2 described below.

Example 9—A9

An LIC laminate cell for a test and evaluation (hereinafter referred to as "A9") was produced in the same manner as in Example 1 (A1) except that the thickness of the positive electrode is changed from 236 μm to 336 μm and the thickness of the negative electrode is changed from 190 μm to 230 μm in the production of the LIC laminate cell A9.

The summary of the cell components and parameters for LIC laminate cell A9 is shown in FIG. 10 representing TABLE 1 described below and the results of the evaluation are also in FIG. 11 representing TABLE 2 described below.

Example 10—A10

An LIC laminate cell for a test and evaluation (hereinafter referred to as "A10") was produced in the same manner as in Example 1 (A1) except that the positive electrode active material is changed from YP-50F (Kuraray Chemical Co., Japan) which has a surface area of 1700 $m^2/g$ to AB-520 (MTI Corporation; USA) which has a surface area of 2000 $m^2/g$ in the production of the LIC laminate cell A10.

The summary of the cell components and parameters for LIC laminate cell A10 is shown in FIG. 10 representing TABLE 1 described below and the results of the evaluation are also in FIG. 11 representing TABLE 2 described below.

Example 11—A11

An LIC laminate cell for a test and evaluation (hereinafter referred to as "A1") was produced in the same manner as in Example 9 (A9) except that the positive electrode active material is changed from YP-50F (Kuraray Chemical Co., Japan) which has a surface area of 1700 $m^2/g$ to AB-520 (MTI Corporation; USA) which has a surface area of 2000 $m^2/g$ in the production of the LIC laminate cell A11.

The summary of the cell components and parameters for LIC laminate cell A11 is shown in FIG. 10 representing TABLE 1 described below and the results of the evaluation are also in FIG. 11 representing TABLE 2 described below.

The LIC laminate cell and the method of making said LIC laminate cell, shown in the drawings and described in detail herein, disclose arrangements of elements of particular construction and configuration for illustrating preferred embodiments of structure and method of operation of the present invention. It is to be understood however, that elements of different construction and configuration and other arrangements thereof, other than those illustrated and described may be employed for providing a LIC laminate cell and the method of making said LIC laminate cell, in accordance with the spirit of the invention, and such changes, alternations and modifications as would occur to those skilled in the art are considered to be within the scope of this invention as broadly defined in the appended claims.

Example 12—B1

Commercial active materials were used for both the positive and negative electrodes as received. The positive electrode (PE) was prepared by coating a slurry mixture of activated carbon (AC) and polytetrafluoroethylene (PTFE) as a binder by the mass ratio of 92:8 on an Al foil substrate which is coated by conductive coating material (20 μm in thickness). The AC material is Elite-C(Calgon Carbon, USA) which has a surface area of about 1700 $m^2/g$. The slurry mixture of the negative electrode (NE) was made of hard carbon (HC, Carbotron P (J). Kureha Japan) and PTFE as a binder by the mass ratio of 94:6. After the slurry was prepared, it was coated onto a Cu foil substrate that had a thickness of 10 μm. Then the electrodes were dried at 160° C. for 2 h in oven with flowing air.

After all the electrodes were dried, a hot-roll pressing was applied to the AC and HC electrode sheets to make them into the desired thickness (total thickness including the double-side carbon conductive coated Al/Cu and the double-side electrode active material layers), 250 μm for PE and 220 μm for NE. All the electrode sheets were kept in the dry room and punched out into electrodes with desired electrode size. The size for the positive electrode is 109×109 mm with 50 mm width and 15 mm length tab; the size for the negative electrode is 110×110 mm with 50 mm width and 15 mm length tab.

Figure 3:
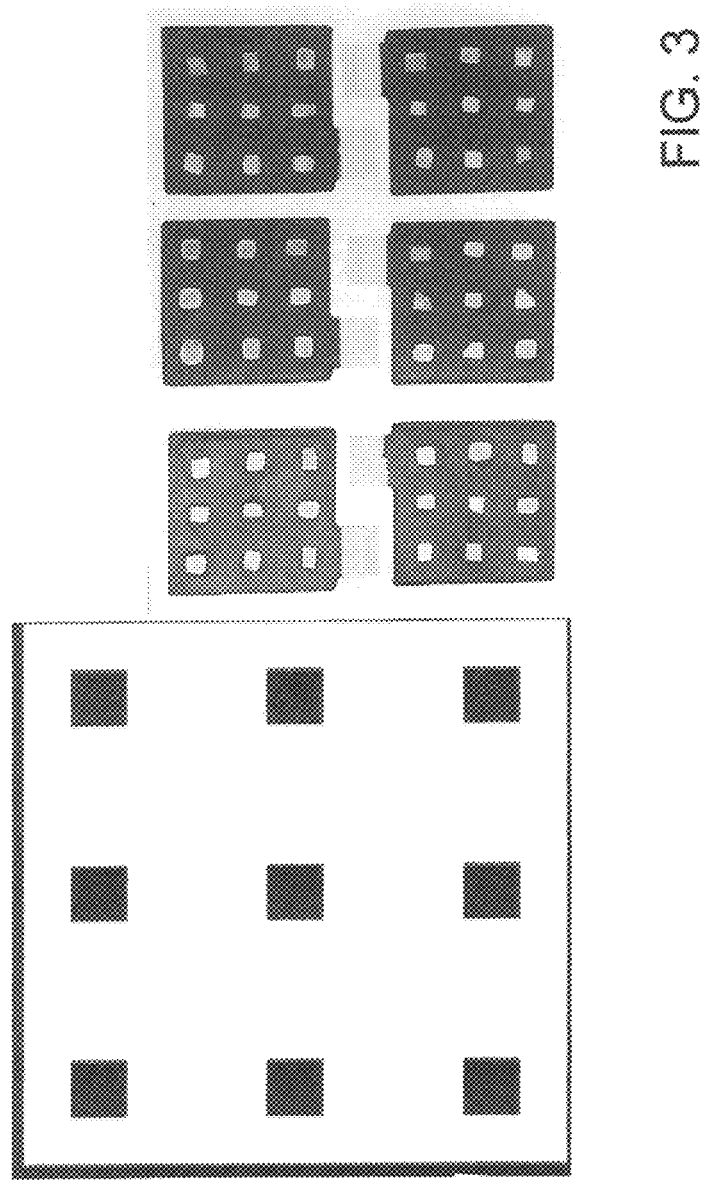
FIG. 3 depicts a 5% Li film mass loading percentage with 120 μm to 140 μm square Li films.
Figure 4:
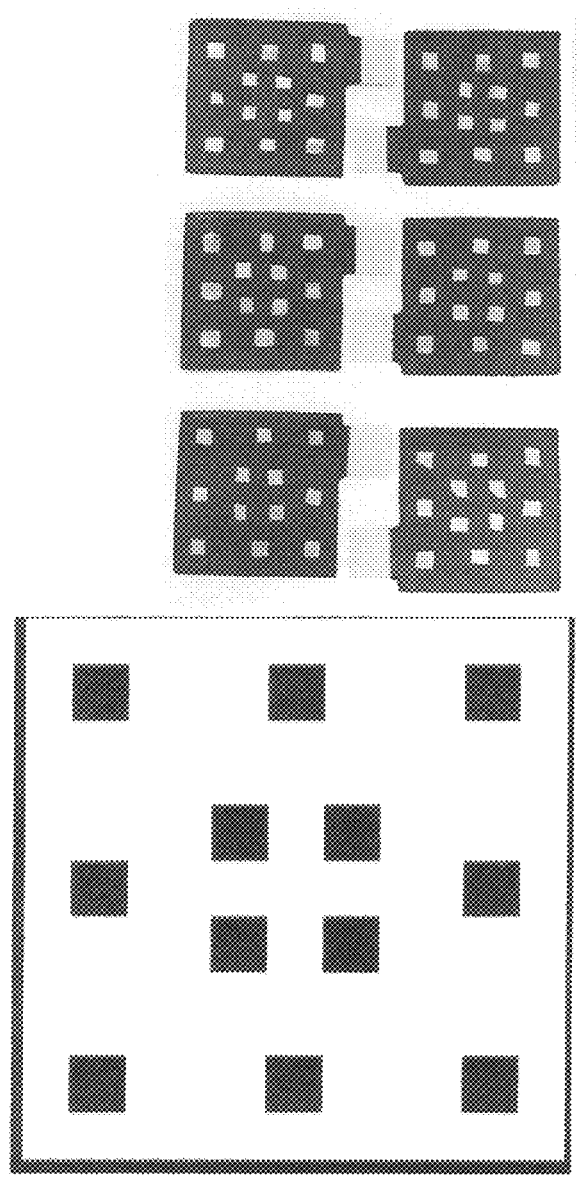
FIG. 4 depicts a 7% Li film mass loading percentage with 120 μm to 140 μm square Li films.

All the electrodes were dried again at 160° C. for overnight in a vacuum oven and then the thin lithium films cut in small square Li pieces were applied onto the surface of all the pre-fabricated HC anode electrodes by hydraulic pressing and then roll-pressing in a dry room as shown in FIG. 3 and FIG. 4 before being assembled into the pouch cell. The thin lithium films, which is purchased from Alfa Aesar, is Li films which can be cut and pressed safely in the dry room. The mass ratio percentage of the thin lithium films loaded onto one side surface of the negative electrode to the one side negative electrode active layer is 7.4%. After the thin lithium film loadings on anode, all the punched electrodes were stacked to form a cell core unit as shown in FIG. 7.

The number of the positive electrode sheets in LIC laminate cell B1 is 7 and the number of the negative electrode sheets in B1 is 8, respectively. It can be seen from FIG. 7 that the Cu and Al substrates were ultrasonic welded to nickel (Ni) and aluminum (Al) current collector tabs with a thickness of 0.2 mm and a width of 50 mm, respectively. After the stacking and welding processes, the cell core was housed in an aluminum laminated formed case that is suitable for the size of the electrodes. Then the vacuum heat sealing process was applied to the case with the cell core in order to remove the excess gas trapped in the cell after the pouch cells were filled with electrolyte.

The separator used was TF40-30 (NKK Nippon Kodoshi Corp., Japan). The electrolyte was 1 M $LiPF_6$ in ethylene carbonate (EC):dimethyl carbonate (DMC) at a ratio of 1:1 by weight (LP30, SelectiLyte™, Merck Electrolyte). After filling electrolyte and the vacuum sealing process, the LIC laminate cell B1 was allowed to stand for 48 hours to let the process of thin lithium films intercalating process complete. Then the LIC laminate cell B1 was charged and discharged under a constant current 10 A from 4 V to 2 V to obtain the capacitance and ESR values.

The specific energy, energy density, usable power and maximum power are calculated based on the following formulas:

Specific Energy:

$$E_s = \frac{C \times (V_{max}^2 - V_{min}^2)}{7.2 \times \text{mass}}$$

Energy Density:

$$E_D = \frac{C \times (V_{max}^2 - V_{min}^2)}{7.2 \times \text{volume}}$$

Maximum Specific Power:

$$P_{max} = \frac{V^2}{4 \times ESR_{DC} \times \text{mass}}$$

Usable Power (Per IEC62391-2):

$$P_d = \frac{0.12V^2}{ESR_{DC} \times \text{mass}}$$

The summary of the cell components, parameters and the results of the evaluation for LIC laminate cell B1 is shown in FIG. 12 representing TABLE 3 described below. Referring now to FIG. 12, TABLE 3 is shown which illustrates the characteristics of example cells B1 through B11 with regard to mass ratio percentage of the thin lithium films loaded onto one side surface of the negative electrode to the one side negative electrode active layer, type of positive electrode material, weight of the packaged cell, LIC size, capacitance, DC-ESR, specific energy, energy density, maximum specific power and maximum power density, all again for example cells B1 through B14. Explanation of those example cells continues below.

Example 13—B2

An LIC laminate cell for a test and evaluation (hereinafter referred to as "B2") was produced in the same manner as in Example 12 (B1) except that the mass ratio percentage of the thin lithium films loaded onto one side surface of the negative electrode to the one side negative electrode active layer is changed from 7.40% to 7.30% in the production of the LIC laminate cell B2.

The summary of the cell components, parameters and the results of the evaluation for LIC laminate cell B2 are shown in FIG. 12 representing TABLE 3 described below.

Example 14—B3

An LIC laminate cell for a test and evaluation (hereinafter referred to as "B3") was produced in the same manner as in Example 12 (B1) except that the mass ratio percentage of the thin lithium films loaded onto one side surface of the negative electrode to the one side negative electrode active layer is changed from 7.40% to 7.23% in the production of the LIC laminate cell B3.

The summary of the cell components, parameters and the results of the evaluation for LIC laminate cell B3 are shown in FIG. 12 representing TABLE 3 described below.

Example 15—B4

An LIC laminate cell for a test and evaluation (hereinafter referred to as "B4") was produced in the same manner as in Example 12 (B1) except that the mass ratio percentage of the thin lithium films loaded onto one side surface of the negative electrode to the one side negative electrode active layer is changed from 7.40% to 7.53% in the production of the LIC laminate cell B4.

The summary of the cell components, parameters and the results of the evaluation for LIC laminate cell B4 are shown in FIG. 12 representing TABLE 3 described below.

Example 16—B5

An LIC laminate cell for a test and evaluation (hereinafter referred to as "B5") was produced in the same manner as in Example 12 (B1) except that the mass ratio percentage of the thin lithium films loaded onto one side surface of the negative electrode to the one side negative electrode active layer is changed from 7.40% to 7.50% in the production of the LIC laminate cell B5.

The summary of the cell components, parameters and the results of the evaluation for LIC laminate cell B5 are shown in FIG. 12 representing TABLE 3 described below.

Example 17—B6

An LIC laminate cell for a test and evaluation (hereinafter referred to as "B6") was produced in the same manner as in Example 12 (B1 except that the mass ratio percentage of the thin lithium films loaded onto one side surface of the negative electrode to the one side negative electrode active layer is changed from 7.40% to 7.11% in the production of the LIC laminate cell B6.

The summary of the cell components, parameters and the results of the evaluation for LIC laminate cell B6 are shown in FIG. 12 representing TABLE 3 described below.

Example 18—B7

An LIC laminate cell for a test and evaluation (hereinafter referred to as "B7") was produced in the same manner as in Example 12 (B1) except that the mass ratio percentage of the thin lithium films loaded onto one side surface of the negative electrode to the one side negative electrode active layer is changed from 7.40% to 7.37% in the production of the LIC laminate cell B7.

The summary of the cell components, parameters and the results of the evaluation for LIC laminate cell B7 are shown in FIG. 12 representing TABLE 3 described below.

Example 19—B8

An LIC laminate cell for a test and evaluation (hereinafter referred to as "B8") was produced in the same manner as in Example 12 (B1) except that the mass ratio percentage of the thin lithium films loaded onto one side surface of the negative electrode to the one side negative electrode active layer is changed from 7.40% to 7.21% in the production of the LIC laminate cell B8.

The summary of the cell components, parameters and the results of the evaluation for LIC laminate cell B8 are shown in FIG. 12 representing TABLE 3 described below.

Example 20—B9

An LIC laminate cell for a test and evaluation (hereinafter referred to as "B9") was produced in the same manner as in Example 12 (B1) except that the mass ratio percentage of the thin lithium films loaded onto one side surface of the negative electrode to the one side negative electrode active layer is changed from 7.40% to 7.51% in the production of the LIC laminate cell B9.

The summary of the cell components, parameters and the results of the evaluation for LIC laminate cell B9 are shown in FIG. 12 representing TABLE 3 described below.

Example 21—B10

An LIC laminate cell for a test and evaluation (hereinafter referred to as "B10") was produced in the same manner as in Example 12 (B1) except that the positive electrode active material is changed from Elite-C(Calgon Carbon, USA) which has a surface area of 1700 $m^2/g$ to CEP21KS (Power Carbon Technology, Korea) which has a surface area of 2000 $m^2/g$ in the production of the LIC laminate cell B10.

The summary of the cell component, parameters and the results of evaluation for LIC laminate cell B10 are shown in FIG. 12 representing TABLE 3 described below.

Example 22—B11

An LIC laminate cell for a test and evaluation (hereinafter referred to as "B11") was produced in the same manner as in Example 12 (B1) except that the positive electrode active material is changed from Elite-C(Calgon Carbon, USA) which has a surface area of 1700 $m^2/g$ to YP-50F (Kuraray Chemical Co., Japan) which also has a surface area of 1700 $m^2/g$ in the production of the LIC laminate cell B11.

The summary of the cell component, parameters and the results of evaluation for LIC laminate cell B11 are shown in FIG. 12 representing TABLE 3 described below.

Example 23—B12

Figure 5:
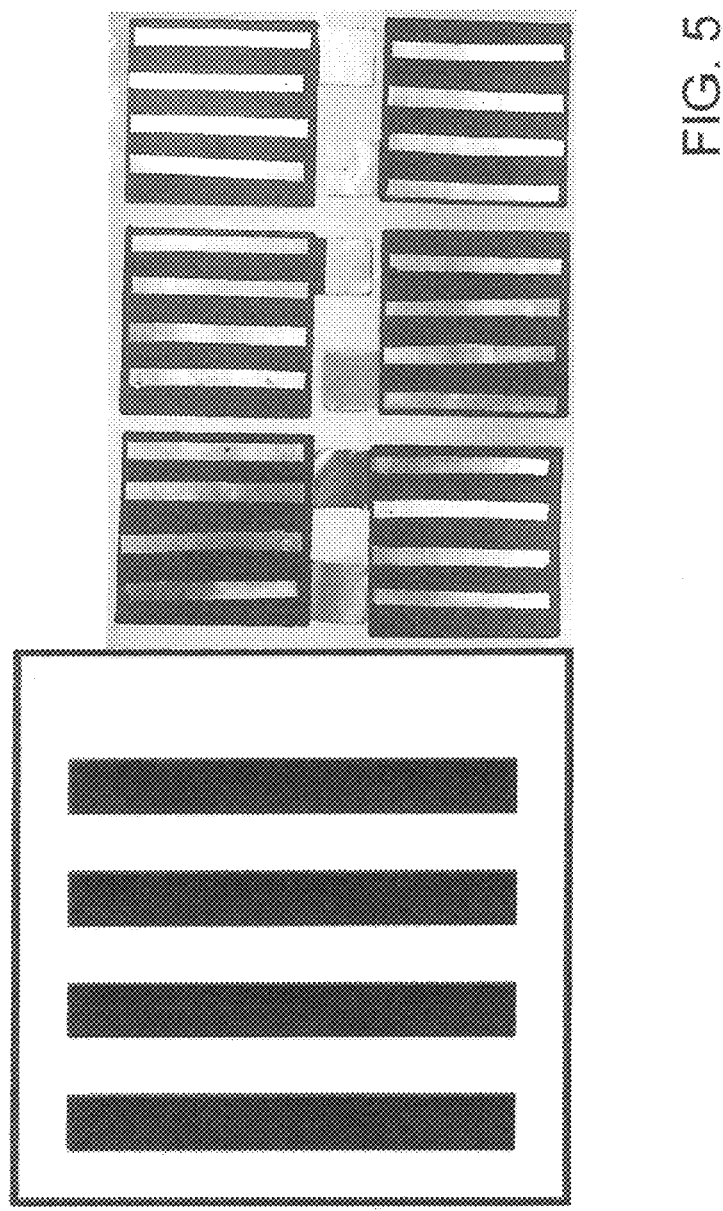
FIG. 5 depicts an 8%-10% Li film mass loading percentage with 45×4×0.045 mm Li strips.

An LIC laminate cell for a test and evaluation (hereinafter referred to as "B12") was produced in the same manner as in Example 12 (B1) except that the thin lithium shape is changed from square Li pieces as shown in FIG. 4 to Li strips as shown in FIG. 5 and the mass ratio percentage of the thin lithium films loaded onto one side surface of the negative electrode to the one side negative electrode active layer is changed from 7.40% to 10.99% in the production of the LIC laminate cell B12.

The summary of the cell components, parameters and the results of the evaluation for LIC laminate cell B12 are shown in FIG. 12 representing TABLE 3 described below.

Example 24—B13

An LIC laminate cell for a test and evaluation (hereinafter referred to as "B13") was produced in the same manner as in Example 12 (B1) except that the thin lithium shape is changed from square Li pieces as shown in FIG. 4 to Li strips as shown in FIG. 5 and the mass ratio percentage of the thin lithium films loaded onto one side surface of the negative electrode to the one side negative electrode active layer is changed from 7.40% to 7.94% in the production of the LIC laminate cell B13.

The summary of the cell components, parameters and the results of the evaluation for LIC laminate cell B13 are shown in FIG. 12 representing TABLE 3 described below.

Example 25—B14

Figure 6:
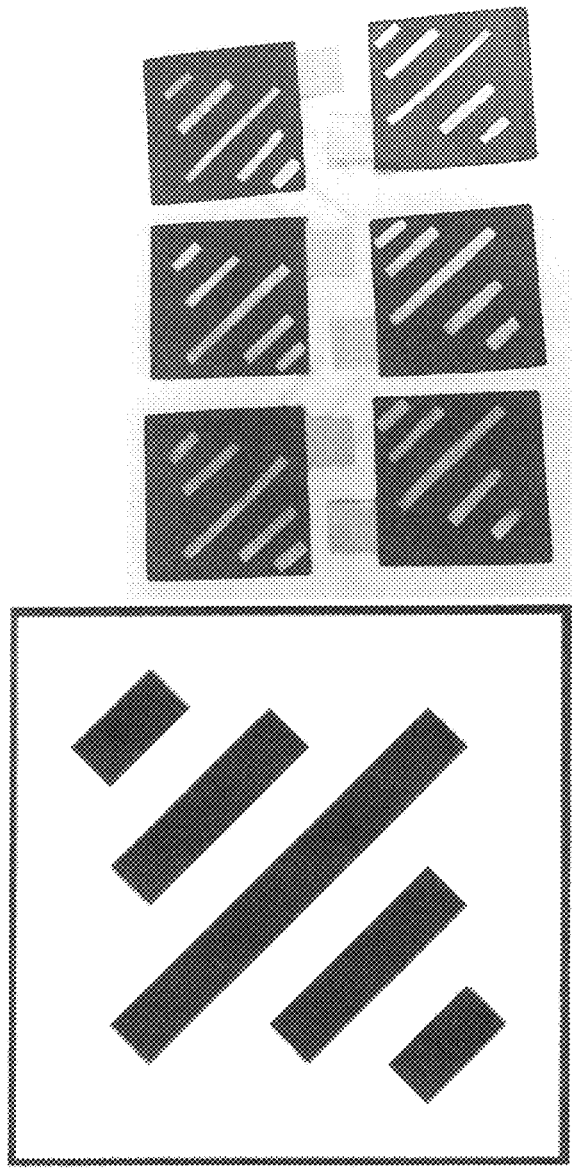
FIG. 6 depicts a 10% Li film mass loading percentage with 3 mm-4 mm width, 0.045 mm thickness and various length Li strips.

An LIC laminate cell for a test and evaluation (hereinafter referred to as "B14") was produced in the same manner as in Example 12 (B1) except that the thin lithium shape is changed from square Li pieces as shown in FIG. 4 to Li strips as shown in FIG. 6 and the mass ratio percentage of the thin lithium films loaded onto one side surface of the negative electrode to the one side negative electrode active layer is changed from 7.40% to 9.93% in the production of the LIC laminate cell B14.

The summary of the cell components, parameters and the results of the evaluation for LIC laminate cell B14 are shown in FIG. 12 representing TABLE 3 described below.

Cycling Performance of the LIC Laminate Cell

Figure 13:
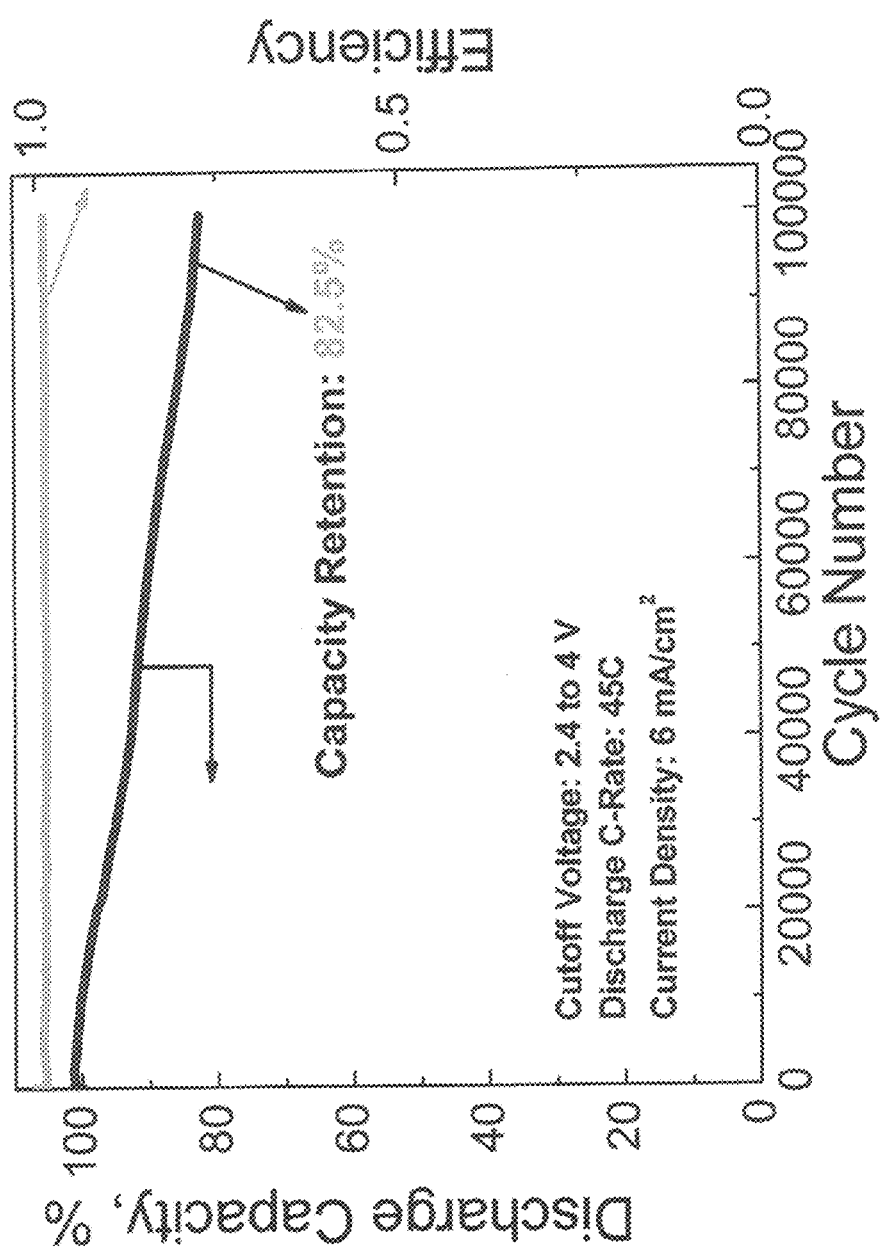
FIG. 13 graphically displays the cycling performance for the LIC laminate cell for Example 1 A1.
Figure 14:
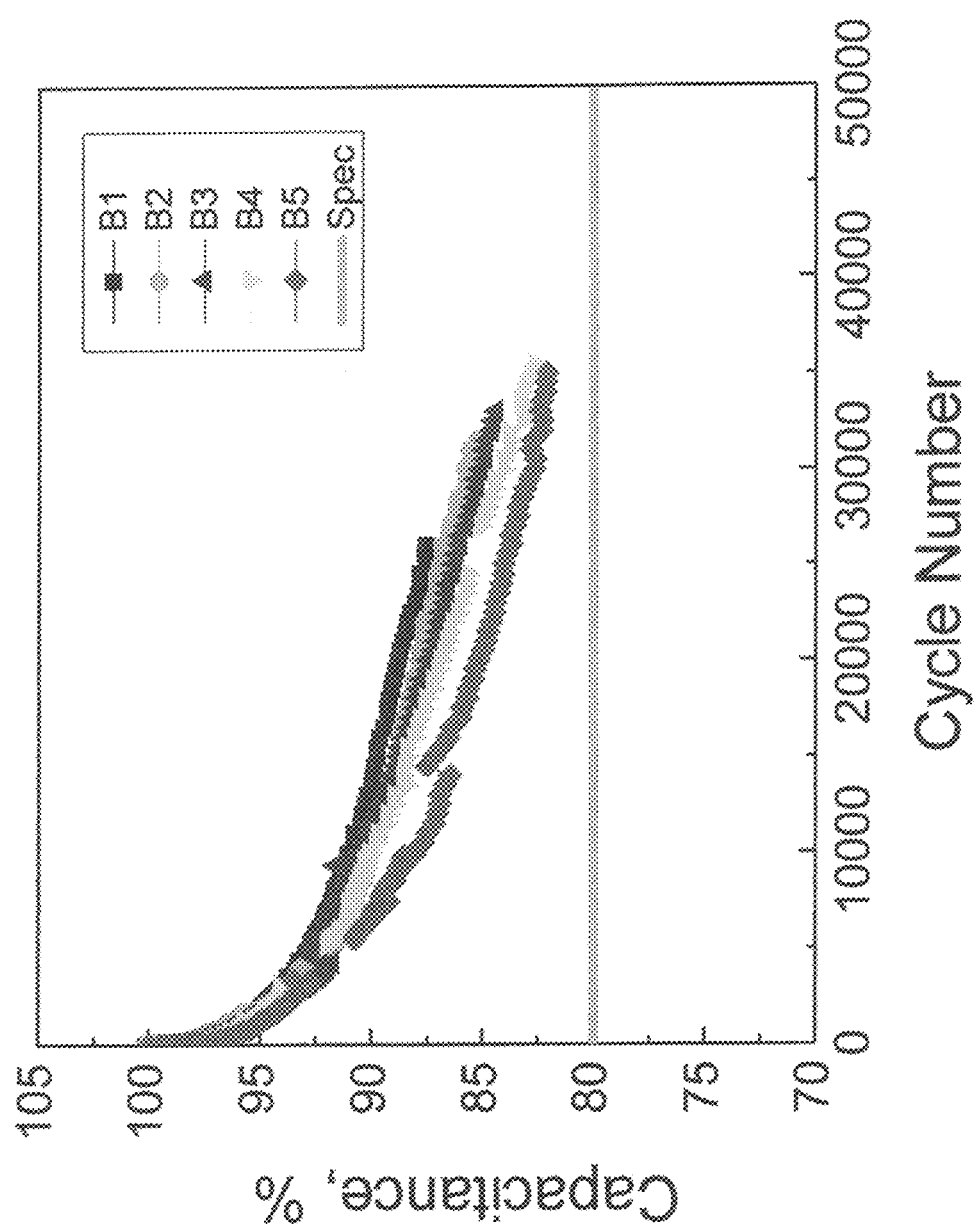
FIG. 14 illustrates the cycle life capacitance percentage decrease for the LIC laminate cell for Examples 12 to 16: B1 to B5.
Figure 15:
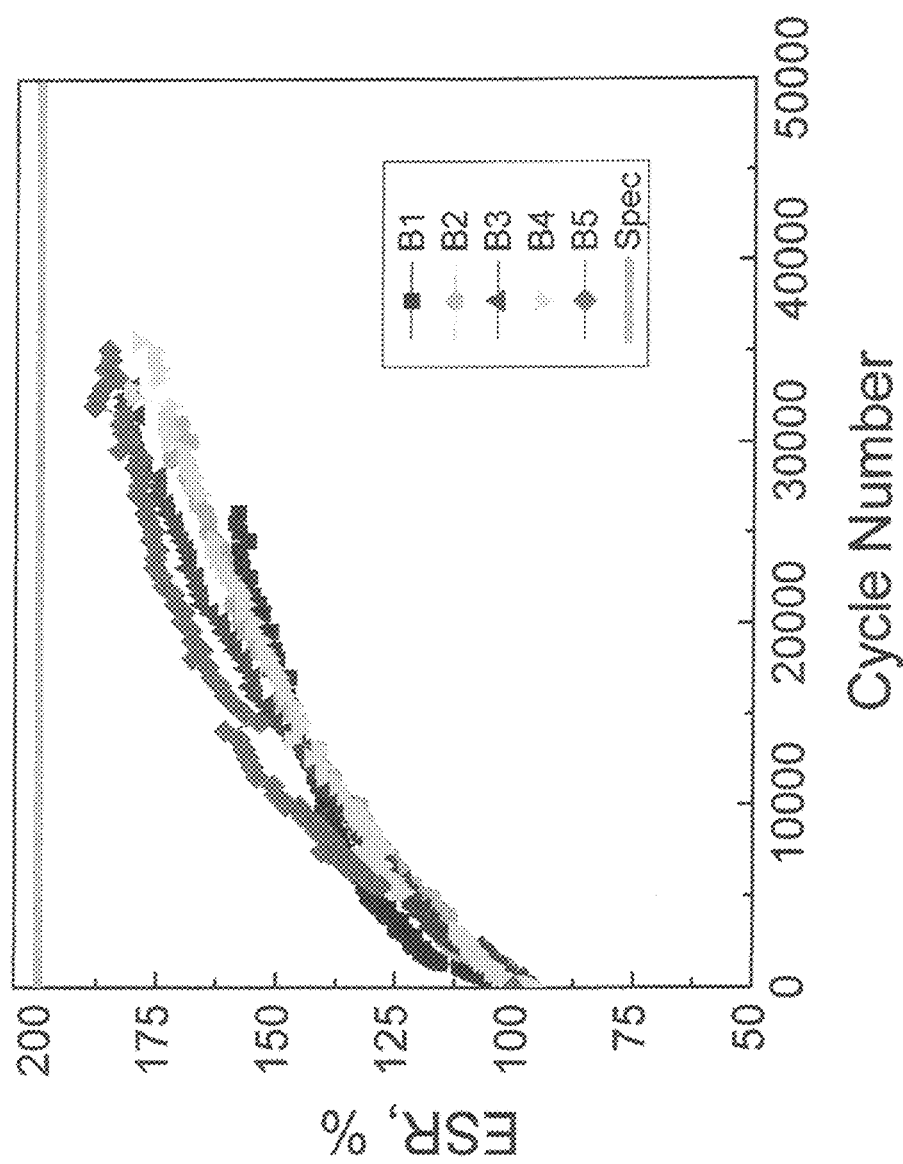
FIG. 15 shows the cycle life DC-ESR increase for Examples 12 to 16.

FIG. 13 displays the cycling performance for the LIC laminate cell for Example 1 A1. The cell A1 was charged and discharged from 4.0 to 2.4 V under a constant current density of 6 $mA/cm^2$. After 100,000 cycles, the cell still can maintain 82.5% of the initial capacity, which demonstrates that the cell with SLMP powder can achieve long cycle life with 100,000 cycles. FIG. 14 shows the cycle life capacitance decrease for Example 12 to 16. It can be seen from the FIG. 14 that all the cells B1 to B5 are in the Spec (>80%) even after 35,000 cycles. FIG. 15 shows the cycle life DC-ESR increase for Example 12 to 16. All the cells' ESR increase are also in the Spec (<200%), which demonstrates the thin Li film LICs can also achieve long cycling performance with at least 35,000 cycles.

The LIC laminate cell and the method of making said LIC laminate cell, shown in the drawings and described in detail herein, disclose arrangements of elements of particular construction and configuration for illustrating preferred embodiments of structure and method of operation of the present invention. It is to be understood however, that elements of different construction and configuration and other arrangements thereof, other than those illustrated and described may be employed for providing a LIC laminate cell and the method of making said LIC laminate cell, in accordance with the spirit of the invention, and such changes, alternations and modifications as would occur to those skilled in the art are considered to be within the scope of this invention as broadly defined in the appended claims.

Further, the purpose of the foregoing abstract is to enable the US Patent and Trademark Office and the public generally, and especially the scientists, engineers and practitioners in the art who are not familiar with patent or legal terms or phraseology, to quickly determine from a cursory inspection, the nature and essence of the technical disclosure of the application. The abstract is neither intended to define the invention of the application, which is measured by the claims, nor is it intended to be limiting as to the scope of the invention in any way.

We claim:

1. A lithium-ion capacitor (LIC) laminate cell comprising:
a positive electrode, a negative electrode, a separator and an organic solvent electrolytic solution with lithium salt as the electrolyte, and thin film lithium sources configured in varying shapes, wherein said negative electrode is pre-doped with lithium ions by placing said thin film lithium sources on the surface of said negative electrode;

wherein the thickness of said thin film lithium sources placed on the surface of said negative electrode is about 5 μm to 150 μm;

and further wherein said thin film lithium sources are placed on the surface of said negative electrode by being pressed onto the surface of said negative electrode.

2. The LIC laminate cell according to claim 1, wherein said thin film lithium sources placed on the surface of said negative electrode include stabilized lithium metal powder (SLMP).

3. The LIC laminate cell according to claim 1 wherein said thin film lithium sources placed on the surface of said negative electrode include square-shaped lithium film pieces.

4. The LIC laminate cell according to claim 1, wherein said thin film lithium sources, placed on the surface of said negative electrode include round-shaped lithium film pieces.

5. The LIC laminate cell according to claim 1, wherein said thin film lithium sources placed on the surface of said negative electrode include lithium film strips.

6. The LIC laminate cell according to claim 1, wherein said positive electrode includes an active material and said active material includes activated carbon.

7. The LIC laminate cell according to claim 1, wherein said positive electrode includes an active material and said active material includes carbon black.

8. The LIC laminate cell according to claim 1, wherein said positive electrode includes an active material and said active material includes activated carbon/carbon black mixed (AC/CB).

9. The LIC laminate cell according to claim 1, wherein said negative electrode includes an active material and said active material includes graphite, hard carbon, soft carbon or $Li_4Ti_5O_{12}$ or a combination mixture of the above negative electrode materials.

10. The LIC laminate cell according to claim 1, wherein said positive electrode includes a binder which includes polytetrafluoroethylene (PTFE), and further wherein said PTFE within said positive electrode active layer includes polytetrafluoroethylene (PTFE) in a range of about 2% to about 14% in positive electrodes active layers.

11. The LIC laminate cell according to claim 1, wherein the total thickness of the positive electrode includes the thickness of double-sided conductive material pre-coated aluminum foil and the thickness of the double-sided active material layers, is about 96 μm to 356 μm.

12. The LIC laminate cell according to claim 1, wherein the total thickness of the negative electrode includes the thickness of double-sided conductive material, pre-coated copper foil and the thickness of the double-sided active material layers, is about 66 μm to 316 μm.

13. The LIC laminate cell according claim 2, wherein the mass per unit area of the SLMP loaded onto one side surface of the negative electrode is about 0.3 mg/cm² to 3 mg/cm².

14. The LIC laminate cell according claim 5, wherein the thickness of the lithium film loaded onto one side surface of the negative electrode is about 15 μm to 100 μm.

15. The LIC laminate cell according claim 14, wherein the mass ratio percentage of said lithium film loaded onto one side surface of the negative electrode and to the one side negative electrode active layer is about 3% to 20%.

16. The LIC laminate cell according to claim 1, wherein the length of said positive and negative electrodes is about 30 mm to 180 mm, and the width of said positive and negative electrodes is about 30 mm to 120 mm.

17. The LIC laminate cell according to claim 1, wherein the length and width of the negative electrode is about 0.5 mm to 3 mm larger than that of the positive electrode.

18. The LAC laminate cell according claim 17, having a tab wherein said tab has a width and thickness and further wherein said tab width is about 0.15 to 0.45 times the length of the negative electrode and said tab thickness is about 0.05 mm to 0.5 mm.

19. The LIC laminate cell according to claim 1, wherein said positive and negative electrodes are composed of layers of sheets, and further wherein the number of the, positive electrode sheets is about 4 to 30 sheets, and the number of the negative electrode sheets is one more than that of the positive electrode sheets.

20. The LIC laminate cell according to claim 1, wherein the material of the separator is a cellulose based or polypropylene (PP) based or polyethylene (PE) based material.

21. A Lithium-ion capacitor (LIC) laminate cell comprising:
    a positive electrode including an active material and a binder;
    a negative electrode including an active material and a binder; and
    a layer of lithium material, wherein said layer of lithium material includes a sheet-shaped lithium material portion distributed to uniformly pre-dope lithium ions into the negative electrode using said active material and said binder; and
    a separator and an organic solvent electrolyte having lithium salt as the electrolyte.

22. The UC laminate cell according to claim 21, wherein said layer of lithium material is pressed upon said negative electrode to enable said layer of lithium material to be uniformly distributed on said active material layer in said negative electrode.

23. The LIC laminate cell according to claim 21, wherein said layer of lithium material includes SLMP.

24. The LIC laminate cell according to claim 21, wherein the thickness of the layer of lithium material is about 15 μm to about 150 μm.

25. The LIC laminate cell according, to claim 21, wherein said sheet-shaped lithium material portion includes a sheet-shaped lithium material portion configured as a thin film having a thickness of about 5 μm to about 150 μm.

26. The LIC laminate cell according to claim 21, wherein the number of negative electrode sheets is always one more than the number of positive electrode sheets.

27. The LIC laminate cell according to claim 21, wherein the number of positive electrode sheets is about 4 to about 30.

* * * * *

(12) EX PARTE REEXAMINATION CERTIFICATE (11528th)

United States Patent
Cao et al.

(10) Number: US 10,002,717 C1
(45) Certificate Issued: Jun. 10, 2019

(54) HIGH PERFORMANCE LITHIUM-ION CAPACITOR LAMINATE CELLS

(71) Applicant: GENERAL CAPACITOR, LLC, Tallahassee, FL (US)

(72) Inventors: Wanjun Cao, Tallahassee, FL (US); Harry Chen, Tallahassee, FL (US)

Reexamination Request:
No. 90/014,173, Aug. 1, 2018

Reexamination Certificate for:
Patent No.: 10,002,717
Issued: Jun. 19, 2018
Appl. No.: 14/927,811
Filed: Oct. 30, 2015

Related U.S. Application Data

(60) Provisional application No. 62/072,472, filed on Oct. 30, 2014.

(51) Int. Cl.
| | | |
|---|---|---|
| H01G 9/00 | (2006.01) | |
| H01G 9/04 | (2006.01) | |
| H01G 9/145 | (2006.01) | |
| H01G 11/06 | (2013.01) | |
| H01M 4/38 | (2006.01) | |
| H01G 11/50 | (2013.01) | |
| H01G 11/24 | (2013.01) | |
| H01G 11/26 | (2013.01) | |
| H01G 11/30 | (2013.01) | |
| H01G 11/42 | (2013.01) | |

(52) U.S. Cl.
CPC ............. *H01G 11/06* (2013.01); *H01G 11/50* (2013.01); *Y02E 60/13* (2013.01)

(58) Field of Classification Search
None
See application file for complete search history.

(56) References Cited

To view the complete listing of prior art documents cited during the proceeding for Reexamination Control Number 90/014,173, please refer to the USPTO's public Patent Application Information Retrieval (PAIR) system under the Display References tab.

*Primary Examiner* — Tuan H Nguyen

(57) ABSTRACT

The present invention provides for high performance lithium-ion capacitor laminate cells that include positive electrodes, negative electrodes and organic solvent electrolyte with lithium salt, and a method for making said high performance lithium-ion capacitor laminate cells. These high performance lithium-ion capacitor laminate cells of the present invention, include a negative electrode which is pre-doped with sufficient lithium ions by employing lithium sources including lithium powder known as SLMP or thin lithium films on the surface of negative electrodes, and this pre-doping with placing lithium sources on negative electrode surface results in LIC laminate cells with considerably higher performance in specific energy, specific power and cycle life.

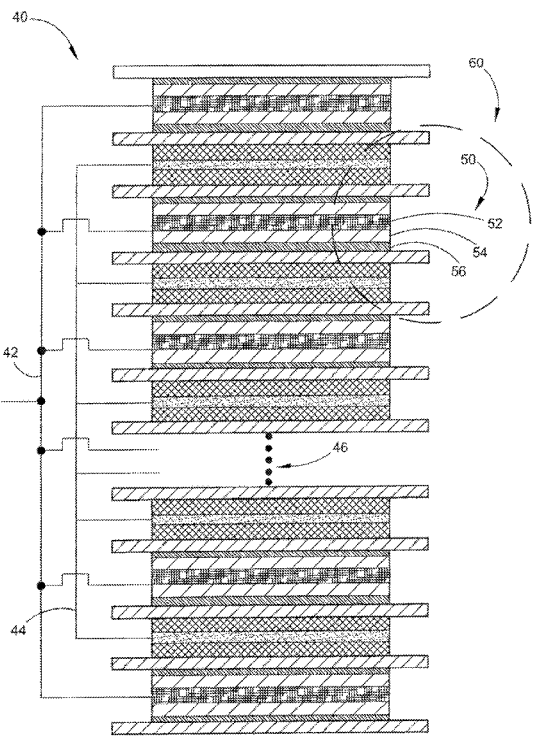

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-27 are cancelled.

* * * * *